United States Patent
Kimura (10) Patent No.: US 12,181,046 B2
(45) Date of Patent: Dec. 31, 2024

(54) VARIABLE STIFFNESS FUNCTION THROUGH A CHECK VALVE IN A HYDRAULIC

(71) Applicant: BorgWarner Inc., Auburn Hills, MI (US)

(72) Inventor: Toshinobu Kimura, Sakurai (JP)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 18/554,592

(22) PCT Filed: Apr. 13, 2021

(86) PCT No.: PCT/US2021/027090
§ 371 (c)(1),
(2) Date: Oct. 9, 2023

(87) PCT Pub. No.: WO2022/220802
PCT Pub. Date: Oct. 20, 2022

(65) Prior Publication Data
US 2024/0191783 A1    Jun. 13, 2024

(51) Int. Cl.
*F16H 7/08* (2006.01)
*F01L 1/02* (2006.01)
*F16K 15/04* (2006.01)

(52) U.S. Cl.
CPC ............ *F16H 7/0848* (2013.01); *F01L 1/022* (2013.01); *F01L 1/024* (2013.01); *F16K 15/044* (2013.01);
(Continued)

(58) Field of Classification Search
CPC .................. F16H 7/08; F16H 2007/08; F16H 2007/0812; F16H 2007/0859; F16H 2007/0817; F01L 1/022; F01L 1/024
(Continued)

(56) References Cited

U.S. PATENT DOCUMENTS

| 976,010 A | 11/1910 | Thompson |
| 979,811 A | 12/1910 | Wallem |

(Continued)

FOREIGN PATENT DOCUMENTS

| DE | 102009049245 A1 | 5/2010 |
| EP | 0645289 A2 | 3/1995 |

(Continued)

OTHER PUBLICATIONS

International Search Report for PCT/2016/030908 dated Aug. 16, 2016.

(Continued)

*Primary Examiner* — Henry Y Liu
(74) *Attorney, Agent, or Firm* — Brown & Michaels, PC (57) ABSTRACT

Check valve assembly for a tensioner with a U-shaped retainer defining a cavity and having at least one retainer opening and axially extending flanges; a moveable member received within the cavity; a check valve spring received within the cavity and between the moveable member and the retainer; a valve seat having axially extending flanges and defining a seat opening nesting within the cavity of the retainer, and a check valve vent washer. The check valve vent washer has an outer circumference with a plurality of spaced apart legs and openings; and an inner circumference in fluid communication with the outer circumference through the openings, the inner circumference has a concentric interior well connecting the plurality of openings to a vent reservoir, a central ring defining a central hole in communication with the internal reservoir, the central ring comprising a vent groove connecting the vent reservoir to the central hole.

9 Claims, 6 Drawing Sheets

(52) U.S. Cl.
CPC .............. *F16H 2007/0806* (2013.01); *F16H 2007/0812* (2013.01); *F16H 2007/0859* (2013.01)

(58) Field of Classification Search
USPC ........................................................ 474/110
See application file for complete search history.

(56) References Cited

U.S. PATENT DOCUMENTS

| | | |
|---|---|---|
| 1,613,145 A | 1/1927 | Trump |
| 1,682,602 A | 8/1928 | Dawley |
| 1,915,694 A | 6/1933 | Reindel |
| 2,167,721 A | 8/1939 | La Brie |
| 2,273,737 A | 2/1942 | Snyder |
| 2,308,876 A | 1/1943 | Hammett |
| 2,767,733 A | 10/1956 | Anderson |
| 2,853,159 A | 9/1958 | Kuhn |
| 2,908,109 A | 10/1959 | Irving |
| 2,960,109 A | 11/1960 | Wilson |
| 3,169,548 A | 2/1965 | Mcintosh |
| 3,269,409 A | 8/1966 | William |
| 3,304,952 A | 2/1967 | Krone |
| 3,415,272 A | 12/1968 | Blackhawk et al. |
| 3,437,065 A | 4/1969 | Robbins, Jr. |
| 3,536,094 A | 10/1970 | Manley, Jr. |
| 3,719,401 A | 3/1973 | Peruglia |
| 3,913,322 A | 10/1975 | Over et al. |
| 4,018,247 A | 4/1977 | Carr |
| 4,237,935 A | 12/1980 | Delmonte et al. |
| 4,253,524 A | 3/1981 | Erickson |
| 4,278,106 A | 7/1981 | Cunningham |
| 4,507,103 A | 3/1985 | Mittermeier |
| 4,526,195 A | 7/1985 | Humphrey et al. |
| 4,628,957 A | 12/1986 | Hofer et al. |
| 4,648,369 A | 3/1987 | Wannenwetsch |
| 4,772,251 A | 9/1988 | Goppelt et al. |
| 4,792,322 A | 12/1988 | Goppelt et al. |
| 4,940,447 A | 7/1990 | Kawashima et al. |
| 5,183,075 A | 2/1993 | Stein |
| 5,197,420 A | 3/1993 | Arnold et al. |
| 5,271,429 A | 12/1993 | Bauer et al. |
| 5,346,436 A | 9/1994 | Hunter et al. |
| 5,406,976 A | 4/1995 | Bekki |
| 5,449,018 A | 9/1995 | Harris |
| 5,469,883 A | 11/1995 | Lee |
| 5,511,583 A | 4/1996 | Bassett |
| 5,577,970 A | 11/1996 | Smith et al. |
| 5,637,047 A | 6/1997 | Schulze |
| 5,655,567 A | 8/1997 | Mikel |
| 5,700,213 A | 12/1997 | Simpson et al. |
| 5,707,309 A | 1/1998 | Simpson |
| 5,819,794 A | 10/1998 | Anderson |
| 5,879,256 A | 3/1999 | Tada |
| 5,901,676 A | 5/1999 | Edelmayer |
| 5,924,438 A | 7/1999 | Cimminelli et al. |
| 5,967,920 A | 10/1999 | Dembosky et al. |
| 5,967,921 A | 10/1999 | Simpson et al. |
| 5,993,341 A | 11/1999 | Anderson |
| 6,006,710 A | 12/1999 | Stephan |
| 6,142,168 A | 11/2000 | Sumrall |
| 6,165,090 A | 12/2000 | Simpson |
| 6,193,623 B1 | 2/2001 | Koch et al. |
| 6,298,873 B1 | 10/2001 | LeVey et al. |
| 6,361,458 B1 | 3/2002 | Smith |
| 6,383,103 B1 | 5/2002 | Fujimoto et al. |
| 6,435,993 B1 | 8/2002 | Tada |
| 6,510,868 B2 | 1/2003 | Penza |
| 6,537,043 B1 | 3/2003 | Chen |
| 6,575,192 B1 | 6/2003 | Shaffer |
| 6,581,632 B2 | 6/2003 | Walpole et al. |
| 6,592,479 B2 | 7/2003 | Nakakubo et al. |
| 6,602,154 B1 | 8/2003 | Guichard et al. |
| 6,716,124 B2 | 4/2004 | Markley |
| 6,811,505 B2 | 11/2004 | Hashimoto et al. |
| 7,028,708 B1 | 4/2006 | Langenfeld et al. |
| 7,108,621 B2 | 9/2006 | Ullein et al. |
| 7,174,799 B2 | 2/2007 | Yoshida et al. |
| 7,258,134 B1 | 8/2007 | Langenfeld et al. |
| 7,367,353 B1 | 5/2008 | Langenfeld et al. |
| 7,404,776 B2 | 7/2008 | Yoshida |
| 7,427,249 B2 | 9/2008 | Yoshida |
| 7,568,497 B1 | 8/2009 | Langenfeld et al. |
| 7,618,339 B2 | 11/2009 | Hashimoto et al. |
| 7,775,921 B2 | 8/2010 | Izutsu et al. |
| 7,775,924 B2 | 8/2010 | Koch |
| 7,913,715 B2 | 3/2011 | Martin |
| 8,002,656 B2 | 8/2011 | Emizu et al. |
| 8,137,224 B2 | 3/2012 | Emizu et al. |
| 8,403,783 B2 | 3/2013 | Wigsten |
| 8,574,106 B2 | 11/2013 | Botez |
| 8,585,519 B2 | 11/2013 | Hartmann |
| 8,951,154 B2 | 2/2015 | Konuma et al. |
| 9,309,878 B2 | 4/2016 | Columpsi |
| 9,765,770 B2 | 9/2017 | Babbini et al. |
| 10,094,449 B2 | 10/2018 | Takagi et al. |
| 10,107,367 B2* | 10/2018 | Kunimatsu .............. F16K 17/04 |
| 10,781,892 B2* | 9/2020 | Cobb ...................... F01L 1/022 |
| 11,028,908 B2* | 6/2021 | Watanabe ............. F16H 7/0848 |
| 2001/0032675 A1 | 10/2001 | Russell |
| 2002/0022541 A1 | 2/2002 | Ullein et al. |
| 2002/0098932 A1 | 7/2002 | Hashimoto et al. |
| 2003/0008738 A1 | 1/2003 | Rossato et al. |
| 2003/0125143 A1 | 7/2003 | Seungpyo |
| 2004/0154666 A1 | 8/2004 | Gessat et al. |
| 2004/0214671 A1 | 10/2004 | Clayton |
| 2004/0266572 A1 | 12/2004 | Yoshida et al. |
| 2005/0064969 A1 | 3/2005 | Tomita et al. |
| 2005/0227799 A1 | 10/2005 | Yoshida |
| 2006/0063625 A1 | 3/2006 | Emizu et al. |
| 2006/0094549 A1 | 5/2006 | Yoshida et al. |
| 2007/0044846 A1 | 3/2007 | Ashurst et al. |
| 2008/0261737 A1 | 10/2008 | Yoshida et al. |
| 2008/0289703 A1 | 11/2008 | Penzone et al. |
| 2008/0293526 A1 | 11/2008 | Wigsten |
| 2008/0318717 A1 | 12/2008 | Kurematsu |
| 2009/0020088 A1 | 1/2009 | Fujii et al. |
| 2009/0197721 A1 | 8/2009 | Emizu et al. |
| 2010/0004080 A1 | 1/2010 | He |
| 2010/0090149 A1 | 4/2010 | Thompson et al. |
| 2011/0015013 A1 | 1/2011 | Hofmann et al. |
| 2011/0237370 A1 | 9/2011 | Hartmann |
| 2011/0263366 A1 | 10/2011 | Botez |
| 2013/0017913 A1 | 1/2013 | Hartmann |
| 2013/0313057 A1 | 11/2013 | Tsukahara et al. |
| 2014/0100068 A1* | 4/2014 | Kurematsu ................ F16H 7/08 474/110 |
| 2014/0200104 A1* | 7/2014 | Kurematsu ................ F16H 7/08 474/110 |
| 2014/0256486 A1 | 9/2014 | Lunk et al. |
| 2015/0267789 A1* | 9/2015 | Kurematsu ................ F16H 7/08 474/110 |
| 2015/0292602 A1* | 10/2015 | Kurematsu ........... F16H 7/0848 474/110 |
| 2015/0354674 A1 | 12/2015 | Markley et al. |
| 2016/0084359 A1* | 3/2016 | Wigsten ................ F16H 7/0848 474/110 |
| 2016/0123435 A1* | 5/2016 | Yoshida .................... F16H 7/08 474/110 |
| 2016/0153530 A1* | 6/2016 | Kitamura .................. F16H 7/08 474/110 |
| 2016/0186838 A1* | 6/2016 | Kurematsu ................ F16H 7/08 474/110 |
| 2016/0290447 A1 | 10/2016 | Kunimatsu et al. |
| 2016/0327135 A1 | 11/2016 | Fischer et al. |
| 2016/0348765 A1 | 12/2016 | Ishikawa et al. |
| 2016/0356365 A1 | 12/2016 | Crump et al. |
| 2017/0023140 A1 | 1/2017 | Crump |
| 2017/0059012 A1 | 3/2017 | Watanabe |
| 2017/0108093 A1 | 4/2017 | Watanabe |
| 2017/0130807 A1 | 5/2017 | Kurematsu |
| 2017/0138443 A1 | 5/2017 | Kurematsu |
| 2017/0211663 A1 | 7/2017 | Furukawa et al. |
| 2017/0356529 A1 | 12/2017 | Simmons |

(56) References Cited

U.S. PATENT DOCUMENTS

| | | |
|---|---|---|
| 2018/0087628 A1 | 3/2018 | Maeda et al. |
| 2018/0128354 A1 | 5/2018 | Watanabe |
| 2018/0274638 A1 | 9/2018 | Watanabe et al. |
| 2019/0003557 A1* | 1/2019 | Cobb .................. F16H 7/08 |
| 2019/0011022 A1 | 1/2019 | Miyazawa |
| 2019/0107178 A1 | 4/2019 | Yoshida et al. |
| 2019/0128389 A1 | 5/2019 | Ullein et al. |
| 2019/0257390 A1 | 8/2019 | Watanabe et al. |
| 2019/0257391 A1 | 8/2019 | Watanabe et al. |
| 2019/0257392 A1 | 8/2019 | Watanabe |
| 2019/0316657 A1 | 10/2019 | Cobb et al. |
| 2019/0316658 A1 | 10/2019 | Sun |
| 2019/0360559 A1 | 11/2019 | Sato |
| 2021/0010570 A1 | 1/2021 | Kurematsu |

FOREIGN PATENT DOCUMENTS

| | | |
|---|---|---|
| EP | 0919744 A1 | 6/1999 |
| GB | 2410332 A | 7/2005 |
| JP | 2005233257 A | 9/2005 |
| JP | 2014077465 A | 5/2014 |
| JP | 2015183767 A | 10/2015 |
| JP | 2016121721 A | 7/2016 |
| KR | 100412611 B1 | 12/2003 |
| KR | 20100091316 A | 8/2010 |
| KR | 20150096686 A | 8/2015 |
| KR | 20150141183 A | 12/2015 |
| WO | 2008027067 A1 | 3/2008 |
| WO | 2012118723 A2 | 9/2012 |
| WO | 2012106093 A3 | 10/2012 |
| WO | 2015048560 A9 | 5/2015 |
| WO | 2015084592 A1 | 6/2015 |
| WO | 2015110104 A1 | 7/2015 |
| WO | 2015116606 A1 | 8/2015 |
| WO | 2020-054666 A1 | 3/2020 |

OTHER PUBLICATIONS

International Search Report for PCT/US2014/066496 dated Mar. 16, 2015.

International Search Report for PCT/US2017/047101 dated Nov. 27, 2017.

International Search Report for PCT/US2018/019640 dated Nov. 26, 2018.

International Search Report for PCT/US2021/027090 dated Dec. 27, 2021.

* cited by examiner

VARIABLE STIFFNESS FUNCTION THROUGH A CHECK VALVE IN A HYDRAULIC

BACKGROUND

The present invention relates to hydraulic tensioners, and more specifically to a variable stiffness function through application of a check valve with a vent in the hydraulic tensioner.

Internal reservoir type chain tensioner use hydraulic stiffness adjustment by restricting oil leak rate with the some components. However, the tensioner stiffness changes significantly with temperature and oil viscosity. Under low temperatures, the hydraulic tensioner generates excessive force by the high viscosity of the oil. Under high temperatures, the tensioner generates insufficient force to control the engine timing system due to the low viscosity of the oil.

Figure 1:
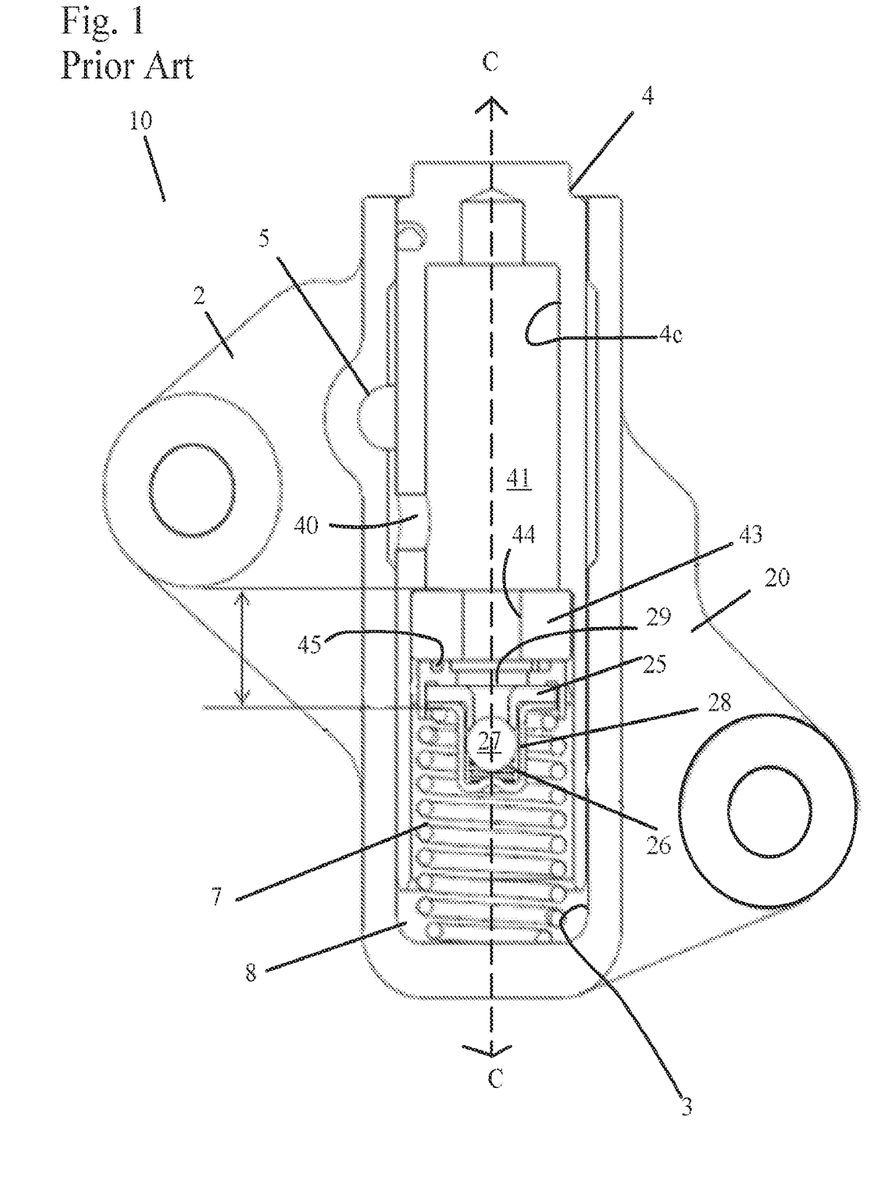
FIG. 1 shows a conventional reservoir type hydraulic tensioner mounted within an engine.

FIG. 1 shows a conventional reservoir type hydraulic tensioner 10. A housing 2 has a closed end bore 3 which receives a hollow piston 4. Along the length of the bore 3 is an oil inlet feed 5 that is in fluid communication with an oil supply. The hollow piston 4 is received within the closed end bore 3 of the housing 2. The hollow piston 4 has a centerline or center plane C-C. Along the length of the body of the piston 4 is a reservoir hole 40 that allows the entry and exit of fluid from an internal reservoir 41 formed within the hollow interior 4c of the piston 4. Also present within the closed end bore 3 is a check valve assembly 20, a washer 43, a high pressure chamber 8 formed between the bore 3, the internal interior 4c of the piston 4, and the check valve assembly 20. The check valve assembly 20 includes a check valve seat 25, a spring 26, a ball 27 and a retainer 28. The washer 43 has a single central hole 44 to the internal reservoir 41. The single central hole 44 is aligned with a hole 29 in the check valve seat 25. In this embodiment, the washer 43 and check valve vent 29 utilize a significant amount of room within the hollow piston 4. A vent groove 45 is present on an outside of the check valve seat 25 and is present between the check valve seat 25 and the washer 43.

A piston spring 7 is present between the check valve assembly 20 and the closed end bore 3 within the high pressure chamber 8. In this design, due to the short space requirements of the check valve seat 25 and the washer 43, the spring is limited to a space of 17 mm. The conventional reservoir type hydraulic tensioner 10 is mounted within engine such that as the piston 4 slidably moves within the closed end bore 3, the reservoir hole 40 of the piston 4 is aligned with the oil inlet feed 5 of the housing 2, since the reservoir hole 40 is above the center plane C-C of the hollow piston 4 when the tensioner housing 2 is mounted to the engine block.

Figure 2:
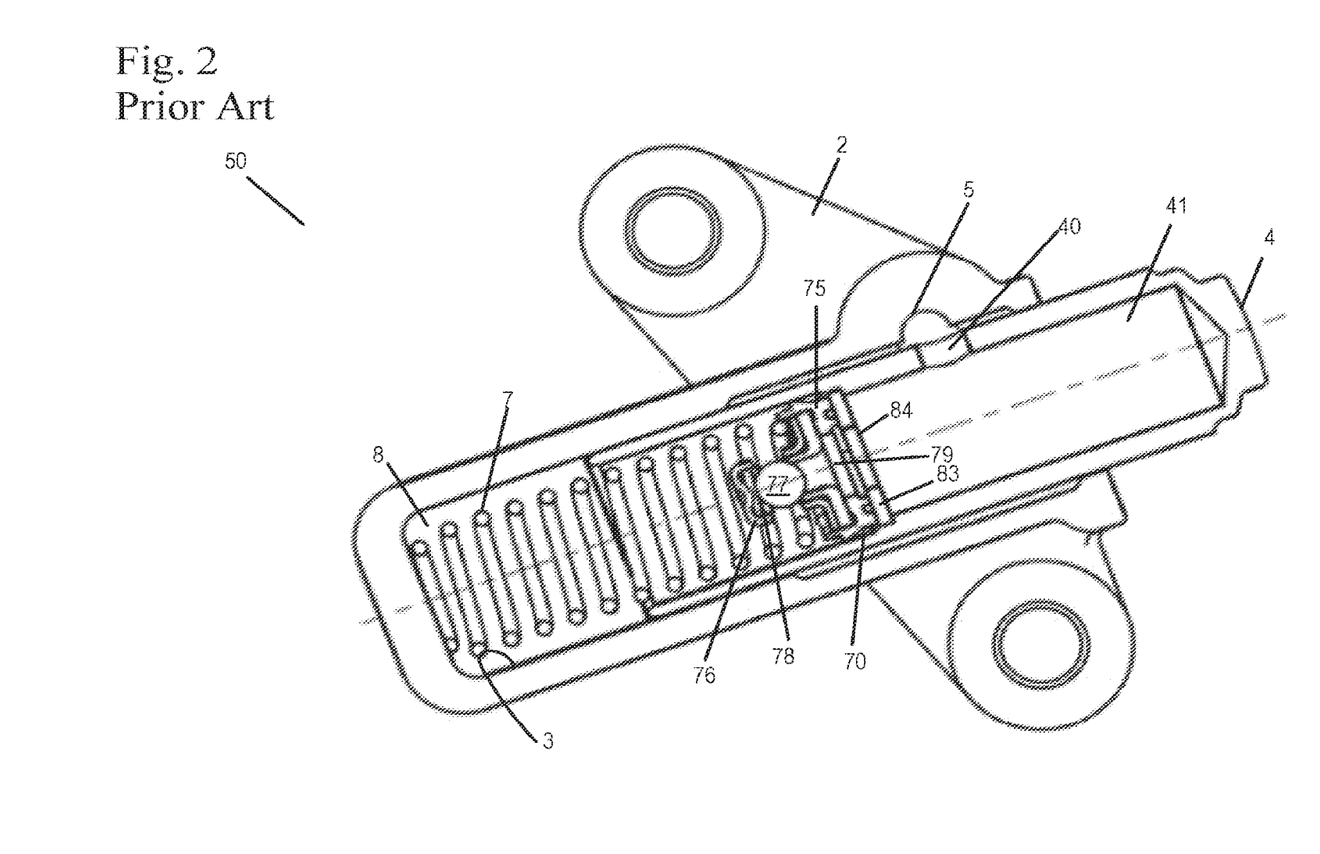
FIG. 2 shows another conventional reservoir type hydraulic tensioner with a check valve assembly.

FIG. 2 shows another conventional reservoir type hydraulic tensioner 50. As in the first embodiment, a housing 2 has a closed end bore 3 which receives a hollow piston 4. Along the length of the bore 3 is an oil inlet feed 5 that is in fluid communication with an oil supply. The hollow piston 4 is received within the closed end bore 3 of the housing 2. The hollow piston 4 has a centerline or center plane C-C. Along the length of the body of the piston 4 is a reservoir hole 40 that allows the entry and exit of fluid from an internal reservoir 41 formed within the hollow interior 4c of the piston 4. Also present within the closed end bore 3 is a check valve assembly 70, a washer 83, a high pressure chamber 8 formed between the bore 3, the internal interior 4c of the piston 4, and the check valve assembly 70. The check valve assembly 70 includes a check valve seat 75, a spring 76, a ball 77 and a retainer 78. The washer 83 has a single central hole 84 to the internal reservoir 41. The single central hole 84 is aligned with a hole 79 in the check valve seat 75. In this embodiment, the washer 83 has to be press fit into the inner diameter of the hollow piston 4. Due to the size and shape of the washer 83, the washer 83 can flip or tilt during tensioner operation and has to be fixed with in the inner diameter of the hollow piston 4. Therefore, the outer diameter of the washer 83 and the inner diameter of the hollow piston 4 has to be manufactured with high precision.

Figure 3:
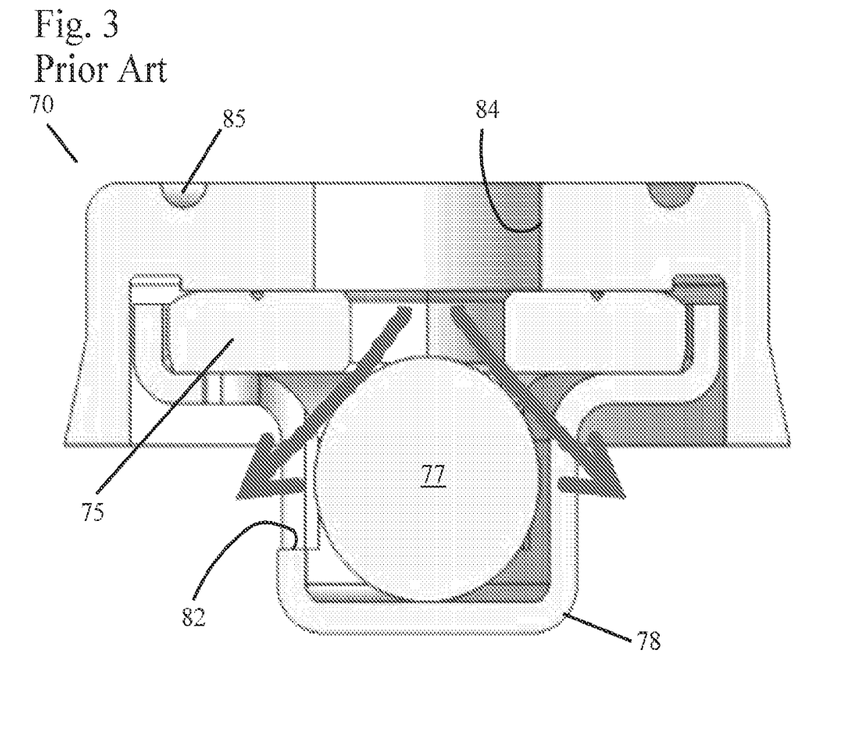
FIG. 3 shows a close up of the check valve assembly of FIG. 2.

FIG. 3 a close up of the conventional check valve assembly of FIG. 2. The check valve assembly 70 includes a check valve retainer 78 which is coupled to the check valve seat 75. The check valve seat 75 has a hole 79 which is aligned with the single central hole 84 of the washer 83. Within the check valve retainer 78 is received a ball 302. The check valve retainer 78 has openings 82. A vent groove 85 is present on an outer portion of the check valve seat 75.

SUMMARY

According to one embodiment of the present invention, the check valve assembly improves the range of variation of the tensioner stiffness by controlling venting and thus the oil flow rate of oil through the check valve assembly of the hydraulic tensioner.

A check valve assembly for a hydraulic tensioner with a U-shaped retainer defining a cavity and having at least one retainer opening and axially extending flanges; a moveable member received within the cavity; a check valve spring received within the cavity and between the moveable member and the retainer; a valve seat having axially extending flanges and defining a seat opening, the valve seat nesting within the cavity of the retainer, such that the axially extending flanges of the valve seat are adjacent the axially extending flanges of the retainer; and a check valve vent washer. The check valve vent washer has an outer circumference with a plurality of spaced apart legs and a plurality of openings; and an inner circumference in fluid communication with the outer circumference through the plurality of openings, the inner circumference comprising: a concentric interior well connecting the plurality of openings to a vent reservoir, a central ring defining a central hole in communication with the internal reservoir, the central ring comprising a vent groove connecting the vent reservoir to the central hole.

In a first position, the moveable member is biased against the disk seat by the check valve spring, sealing the seat opening, preventing fluid from passing from the internal reservoir to the hydraulic pressure chamber and in a second position, the moveable member is biased against the check valve spring, such that fluid can flow from the internal reservoir to the hydraulic pressure chamber through the seat opening. When the check valve assembly is in the first position, fluid from the high pressure chamber leaks into at least one of the plurality of openings, into the concentric interior well, into the internal reservoir to the vent groove and to the central hole in fluid communication with the internal reservoir.

In an embodiment of the present invention, the space for the tensioner spring is increased over the prior art and the shape of the check valve vent washer prevents tilting or flipping during tensioner use, such that the check valve vent washer can be placed within the hollow piston with a clearance fit and does not require high precision for a press fit.

DETAILED DESCRIPTION

FIG. 4-7 show a hydraulic tensioner and associated components of an embodiment of the present invention. The hydraulic tensioner 100 can be used for an endless loop, flexible, power transmission member for an internal combustion engine of a motor vehicle, such as a chain or belt. The power transmission member encircles a drive sprocket driven by a drive shaft, such as a crank shaft of the engine, and the at least one driven sprocket supported from a driven shaft, such as a cam shaft of the engine.

Figure 4:
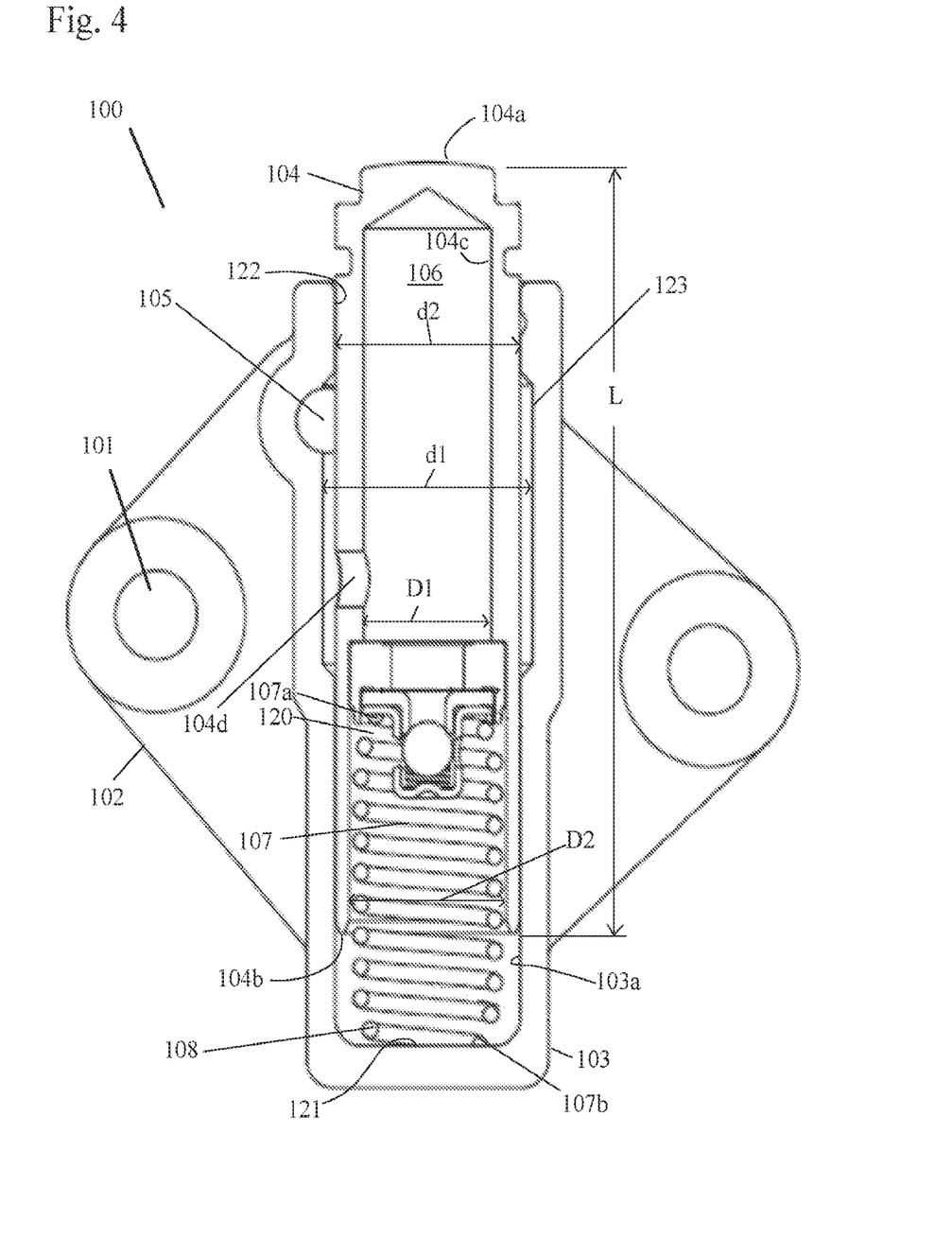
FIG. 4 shows a schematic of a hydraulic tensioner of an embodiment of the present invention.

The hydraulic tensioner is mounted to an engine block of an internal combustion engine (not shown) via a mounting plate 102. The mounting plate 102 is secured to the engine block (not shown) via bolts or screws received in mounting plate holes 101. The mounting plate 102 is coupled to or formed in part with a tensioner housing 103. The tensioner housing 103 has a closed end multi-staged internal bore 103a. Between the closed end 121 of the bore 103a and the open end 122 of the bore 103a is an inlet portion 123 of the bore 103a which has a diameter d1, which is greater than the diameter d2 of the bore 103a at the closed end 121 and the open end 122 of the bore. An oil inlet 105 is present in the inlet portion 123 of the bore 13a and is in fluid communication with a fluid supply (not shown).

A hollow piston 104 is slidably received within the bore 103a of the housing 103. The hollow piston 104 has a body with a first end 104a, a second end 104b, and a length L between the first end 104a and the second end 104b. The first end 104a of the hollow piston 4 is in contact with a tensioner body, guide or endless loop, flexible, power transmission member for an internal combustion engine. The second end 104b of the hollow piston 104 is received within the bore 103a of the tensioner housing 103.

The hollow piston 4 has an internal bore 104c. The internal bore 104c of the hollow piston 4 has a first diameter D1 and a second diameter D2. The first diameter D1 is preferably smaller than the second diameter D2. Along the length L of the hollow piston 104 is an inlet 104d which is in communication with the oil inlet 105.

A check valve assembly 120 is received within the second diameter D2 of the internal bore 104c of the piston 104, dividing the internal bore 104c into an internal reservoir 106 and a high pressure chamber 108. The internal reservoir 106 is formed between the first diameter D1 of the internal bore 104c and the check valve assembly 120. The high pressure chamber 108 is formed between the check valve assembly 120, the second diameter D2 of the internal bore 104c of the piston 104, the second end 104b of the piston 104, and the closed end 121 of the bore 103a of the housing 103. A spring 107 is also preferably present within the high pressure chamber 108, with a first end 107a of the spring 107 biased against the check valve assembly 120 and the second end 107b of the spring 107 biased against the closed end 121 of the bore 103a of the housing 103, biasing the check valve assembly 120, and thus the piston 104 outwards and away from the closed end 121 of the bore 103a of the tensioner housing 103.

Figure 5:
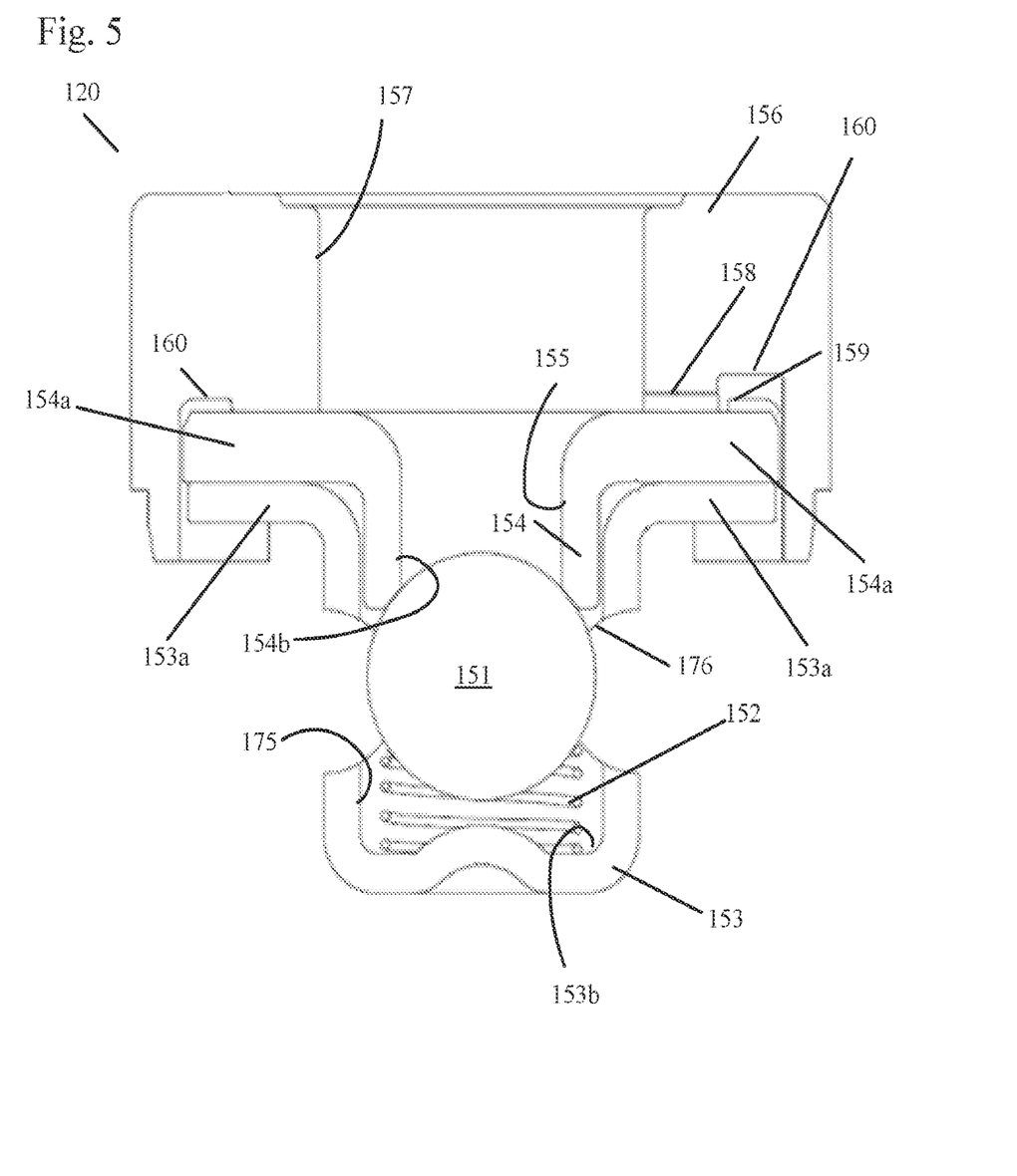
FIG. 5 shows a close up of the check valve assembly in the hydraulic tensioner of FIG. 4.
Figure 6:
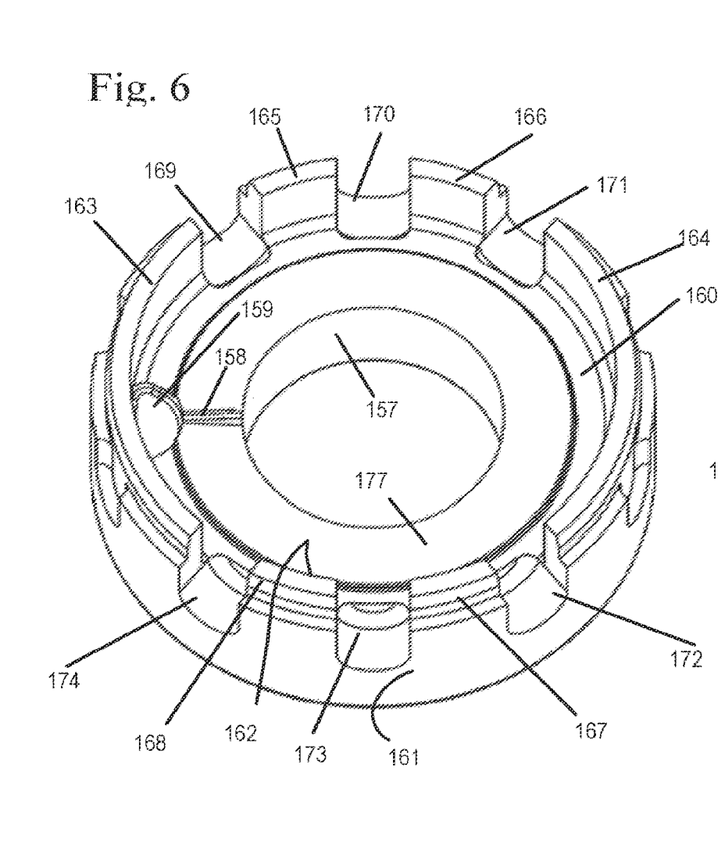
FIG. 6 shows a top view of the check valve vent.
Figure 7:
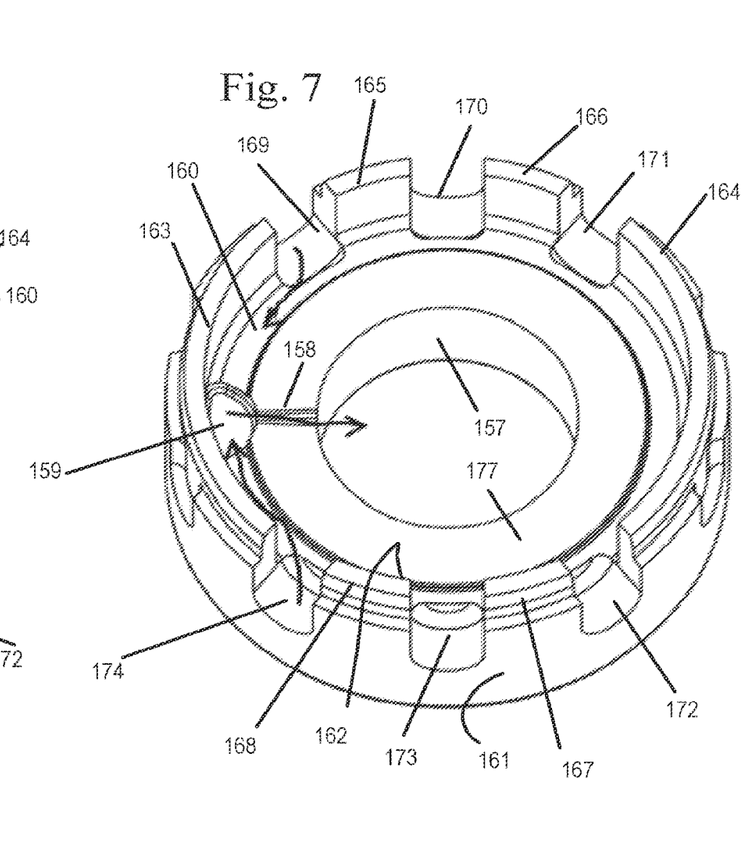
FIG. 7 shows fluid flow associated with the check valve vent.

Referring to FIGS. 5-7, the check valve assembly 120 includes a retainer 153, a valve seat 154, a check valve spring 152, a moveable member 151, and a check valve vent washer 156.

The retainer 153 is U-shaped and defines a cavity 175 which receives a moveable member 151, a spring 152 and a valve seat 154. Between the bottom 153b and the flanges 153a of the U-shaped retainer 153 is at least one retainer opening 176. Also partially received within the retainer 153 is a valve seat 154. The moveable member 151, shown as being ball shaped, and the check valve spring 152 are held between the valve seat 154 and the retainer 153. The valve seat 154 includes a seat opening 154b, against which the ball 151 is biased by the check valve spring 152 to bias the check valve toward the closed position shown in FIG. 5. The valve seat 154 is includes flanges 154a which extend axially outwards. The valve seat 154 nests within the cavity 175 of the retainer 153, such that the flanges 153a of the U-shaped retainer 153 are adjacent the flanges 154a of the valve seat 154.

A cup-shaped check valve vent washer 156 receives the flanges 154a of the valve seat 154 and the flanges 153a of the U-shaped retainer 153 within an inner circumference 162 within the cup. The check valve vent washer 156 has a radially symmetric profile with an outer circumference 161 and an inner circumference 162 with an interior well 160 surrounding a ring 177 with a central hole 157. The outer circumference 161 of the cup-shaped check valve vent washer 156 has a plurality of legs 163, 164, 165, 166, 167, 168 and leg openings 169, 170, 171, 172, 173, 174 defining the inner circumference 162 of the cup. The outer circumference 161 preferably includes a first long leg 163, opposite a second long leg 164, with at least one short leg 165, 166, 167, 168 between the first long leg 163 and the second long leg 164 separated by openings 169, 171, 174, 172 on either side. Therefore, in one embodiment, around the outer circumference 161, the check valve vent washer 156 has a first long leg 163, a first opening 169, a first short leg 165, a second opening 170, a second short leg 166, a third opening 171, a second long leg 164 diametrically opposite the first long leg 163, a fourth opening 172, a third short leg 167, a fifth opening 173, a fourth short leg 161 and a sixth opening 174.

It is noted that in another embodiment, the second opening 170 and fifth opening 173 could be removed and the first short leg 165 and second short leg 166 could be combined to form a single leg with a first opening 169 on one side and the third opening 171 on the other side. Similarly, the fourth short leg 168 and the third short leg 167 could be combined to form a single leg with the sixth opening 174 and the fourth opening 172 on either side.

The legs 163, 164, 165, 166, 167, 168 of the outer circumference 161 of the check valve vent washer 156 allows a backflow path of hydraulic fluid, which is typically oil, into the hydraulic fluid reservoir 106.

The openings 169, 170, 171, 172, 173, 174 between the legs 163, 164, 165, 166, 167, 168 extend from an outer surface of the outer circumference 161 to the inner circumference 162 and towards the inner central hole 157. In some embodiments, the openings 169, 170, 171, 172, 173, 174 are arched openings having a concave shape, but any shape can be used.

The interior well 160 within the inner circumference 162 of the check valve vent washer 156 connects the openings 169, 170, 171, 172, 173, 174 to a vent reservoir 159 adjacent a long leg 163. The vent reservoir 159 is in fluid communication with a vent groove 158 that extends radially across the ring 177 to the central hole 157. The vent groove 158 aids in adjusting the oil leak rate from the high pressure chamber 108 of the tensioner. The openings 169, 170, 171, 172, 173, 174 are not aligned with the vent reservoir 159, such that the openings 169, 170, 171, 172, 173, 174 do not extend radially into vent reservoir 159.

The check valve vent legs 163, 164, 165, 166, 167, 168 are preferably of a substantially uniform thickness and is preferably formed from a single piece.

By having the vent groove 158 being internal to the check valve assembly 120, the space required for the check valve assembly 120 is significantly reduced in comparison to the prior art, for example shown in FIG. 1, such that the space for the tensioner spring can be expanded along, widening the acceptable range of spring specifications for use within the tensioner. For example, the space associated with the tensioner spring in an embodiment of the present invention is 20.44 mm in comparison to 17 mm as in the prior art. Furthermore, the oil vent groove 158 is set at the position where it is easily deformed by the oil pressure at high pressure chamber 108.

The vent groove allows for a controllable oil leak rate from the high pressure chamber 108 to the internal reservoir 106. The oil leaks from the high pressure chamber 108 through any one of the vent openings 169, 170, 171, 172, 173, 174 to the internal well 160, through the vent reservoir 159, through the vent groove 158 and to the central hole 157 and into the internal reservoir 106. The controllable oil leak from the high pressure chamber 108 to the internal reservoir 106 can occur when the check valve assembly is in a closed position where the moveable member 151 is seated against the valve seat 154.

The cross-sectional area of the vent groove 158 varies depending on the temperature and load conditions of the hydraulic tensioner. For high temperatures and high load conditions, the cross-sectional area of the vent groove 158 is larger than a hydraulic tensioner which is present in low temperatures and low load conditions.

The check valve vent washer is preferably made of a resin that has rigidity which decreases at high temperature conditions. For example, polyamide resin (PA6/PA66) or polyamide resin with glass fibers (PA66+GF).

When the check valve assembly 120 is an open position, pressurized fluid flows into the check valve assembly 120 through the seat opening 155 by pushing the ball 151 away from the valve seat 156, against the bias of the check valve spring 152, such that the check valve assembly 120 is moved to an open position. Pressurized fluid flows out of the check valve assembly 120 through the at least one retainer opening 176.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A hydraulic tensioner for an internal combustion engine for tensing a span of a chain or a belt comprising:
    a housing having a bore with a first open end in communication with a fluid input, and a second closed end;
    a hollow piston slidably received within the bore of the housing, the piston comprising a body having an open end and a closed end, a bottom surface at the open end, a top surface at the closed end, a fluid inlet between the open end and the closed end, and a hollow bore defining an internal reservoir in communication with the fluid input through the fluid inlet of the body of the piston;
    a hydraulic pressure chamber defined by the hollow bore of the body of the piston, and between the open end of the body of the piston and the second closed end of the bore of the housing;
    a piston spring received within the hydraulic pressure chamber for biasing the piston away from the second closed end of the bore of the housing;
    a check valve assembly received within the hollow bore of the body of the piston between the internal reservoir and the hydraulic pressure chamber, the check valve assembly comprising:
        a U-shaped retainer defining a cavity and having at least one retainer opening and axially extending flanges;
        a moveable member received within the cavity;
        a check valve spring received within the cavity and between the moveable member and the retainer;
        a valve seat having axially extending flanges and defining a seat opening, the valve seat nesting within the cavity of the retainer, such that the axially extending flanges of the valve seat are adjacent the axially extending flanges of the retainer;
        a check valve vent washer comprising:
            an outer circumference with a plurality of spaced apart legs and a plurality of openings; and
            an inner circumference in fluid communication with the outer circumference through the plurality of openings, the inner circumference comprising: a concentric interior well connecting the plurality of openings to a vent reservoir, a central ring defining a central hole in communication with the internal reservoir, the central ring comprising a vent groove connecting the vent reservoir to the central hole;
        wherein, in a first position, the moveable member is biased against the disk seat by the check valve spring, sealing the seat opening, preventing fluid from passing from the internal reservoir to the hydraulic pressure chamber and in a second position, the moveable member is biased against the check valve spring, such that fluid can flow from the internal reservoir to the hydraulic pressure chamber through the seat opening;
        wherein when the check valve assembly is in the first position, fluid from the high pressure chamber leaks into at least one of the plurality of openings, into the concentric interior well, into the internal reservoir to the vent groove and to the central hole in fluid communication with the internal reservoir.

2. The hydraulic tensioner of claim 1, wherein the bore has at least a first inner diameter and a second inner diameter, the first inner diameter defining the internal reservoir and the second inner diameter defining at least part of the hydraulic pressure chamber.

3. The hydraulic tensioner of claim 1, wherein at least one of the plurality of spaced apart legs are longer in length than other of the plurality of spaced apart legs.

4. The hydraulic tensioner of claim 1, wherein the vent reservoir is not aligned with one of the plurality of plurality of openings.

5. The hydraulic tensioner of claim 1, wherein the moveable member is a ball.

6. A check valve assembly for a hydraulic tensioner received between an internal reservoir and a hydraulic pressure chamber comprising:
- a U-shaped retainer defining a cavity and having at least one retainer opening and axially extending flanges;
- a moveable member received within the cavity;
- a check valve spring received within the cavity and between the moveable member and the retainer;
- a valve seat having axially extending flanges and defining a seat opening, the valve seat nesting within the cavity of the retainer, such that the axially extending flanges of the valve seat are adjacent the axially extending flanges of the retainer;
- a check valve vent washer comprising:
  - an outer circumference with a plurality of spaced apart legs and a plurality of openings; and
  - an inner circumference in fluid communication with the outer circumference through the plurality of openings, the inner circumference comprising: a concentric interior well connecting the plurality of openings to a vent reservoir, a central ring defining a central hole in communication with the internal reservoir, the central ring comprising a vent groove connecting the vent reservoir to the central hole;

wherein, in a first position, the moveable member is biased against the disk seat by the check valve spring, sealing the seat opening, preventing fluid from passing from the internal reservoir to the hydraulic pressure chamber and in a second position, the moveable member is biased against the check valve spring, such that fluid can flow from the internal reservoir to the hydraulic pressure chamber through the seat opening;

wherein when the check valve assembly is in the first position, fluid from the high pressure chamber leaks into at least one of the plurality of openings, into the concentric interior well, into the internal reservoir to the vent groove and to the central hole in fluid communication with the internal reservoir.

7. The check valve assembly of claim 6, wherein at least one of the plurality of spaced apart legs are longer in length than other of the plurality of spaced apart legs.

8. The check valve assembly of claim 6, wherein the vent reservoir is not aligned with one of the plurality of plurality of openings.

9. The check valve assembly of claim 6, wherein the moveable member is a ball.

* * * * *